US009158897B2

(12) United States Patent
Spiegler et al.

(10) Patent No.: US 9,158,897 B2
(45) Date of Patent: *Oct. 13, 2015

(54) METHODS AND SYSTEMS FOR DISTRIBUTING RIGHT-PROTECTED ASSET

(75) Inventors: Julie Spiegler, Montara, CA (US); Gever Tulley, Montara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1300 days.

This patent is subject to a terminal disclaimer.

(21) Appl. No.: 12/271,859

(22) Filed: Nov. 15, 2008

(65) Prior Publication Data
US 2014/0033312 A1 Jan. 30, 2014

(51) Int. Cl.
*G06Q 99/00* (2006.01)
*G06F 21/10* (2013.01)
*G06Q 20/12* (2012.01)

(52) U.S. Cl.
CPC ............ *G06F 21/10* (2013.01); *G06Q 20/1235* (2013.01); *G06Q 2220/10* (2013.01); *G06Q 2220/18* (2013.01)

(58) Field of Classification Search
CPC .......... G06Q 20/1235; G06Q 2220/10; G06Q 2220/18
USPC .................................. 705/50–59; 726/26–33
See application file for complete search history.

(56) References Cited

U.S. PATENT DOCUMENTS

| 7,124,443 | B2 | 10/2006 | Ishibashi et al. |
| 7,725,002 | B2 | 5/2010 | Nakajima et al. |
| 7,904,929 | B1 | 3/2011 | Jaunin et al. |
| 2001/0034771 | A1 | 10/2001 | Hütsch et al. |
| 2002/0081971 | A1 | 6/2002 | Travostino |
| 2002/0132616 | A1 | 9/2002 | Ross et al. |
| 2003/0200313 | A1 | 10/2003 | Peterka et al. |
| 2003/0217142 | A1 | 11/2003 | Bobde et al. |
| 2004/0193680 | A1* | 9/2004 | Gibbs et al. .................. 709/203 |
| 2004/0219983 | A1 | 11/2004 | Giobbi |
| 2005/0091118 | A1 | 4/2005 | Fano |
| 2005/0091595 | A1 | 4/2005 | Shappell et al. |
| 2005/0147130 | A1 | 7/2005 | Hurwitz et al. |
| 2005/0239454 | A1* | 10/2005 | Kawashima et al. ...... 455/426.1 |
| 2006/0009155 | A1* | 1/2006 | Paalasmaa et al. .......... 455/41.2 |
| 2006/0139687 | A1 | 6/2006 | Ohara et al. |
| 2006/0205402 | A1 | 9/2006 | Banavar et al. |
| 2006/0236097 | A1 | 10/2006 | Prologo et al. |
| 2007/0138302 | A1 | 6/2007 | Antoniou |
| 2007/0162971 | A1 | 7/2007 | Blom et al. |
| 2007/0180494 | A1 | 8/2007 | Casey et al. |
| 2007/0183342 | A1 | 8/2007 | Wong et al. |
| 2007/0223370 | A1 | 9/2007 | Spear |

(Continued)

OTHER PUBLICATIONS

Non-Final Office Action dated Jun. 28, 2010 in U.S. Appl. No. 12/271,855, 8 pages.

(Continued)

*Primary Examiner* — James D Nigh
(74) *Attorney, Agent, or Firm* — Shook, Hardy & Bacon, L.L.P.

(57) ABSTRACT

A method includes allowing a right-protected asset to be shared by a first device with a second device while they are within a determinable proximity of one another. Subsequent to the sharing, an option to acquire the right-protected asset is presented to the second device when the first device and the second device are not within the determinable proximity of one another.

20 Claims, 10 Drawing Sheets

(56) References Cited

U.S. PATENT DOCUMENTS

| | | | |
|---|---|---|---|
| 2007/0234048 | A1 | 10/2007 | Ziv |
| 2007/0268911 | A1 | 11/2007 | Alve |
| 2008/0010457 | A1* | 1/2008 | Lee et al. ............... 713/169 |
| 2008/0040283 | A1* | 2/2008 | Morris ..................... 705/59 |
| 2008/0109888 | A1 | 5/2008 | Ullah |
| 2008/0133736 | A1 | 6/2008 | Wensley et al. |
| 2008/0147798 | A1 | 6/2008 | Paalasmaa et al. |
| 2008/0167015 | A1 | 7/2008 | Vishwanathan et al. |
| 2008/0201479 | A1 | 8/2008 | Husain et al. |
| 2008/0310819 | A1 | 12/2008 | Akiyama et al. |
| 2009/0083132 | A1 | 3/2009 | Doganaksoy et al. |
| 2009/0089293 | A1 | 4/2009 | Garritano et al. |
| 2009/0094370 | A1 | 4/2009 | Jacob et al. |
| 2009/0298514 | A1* | 12/2009 | Ullah ................. 455/456.5 |
| 2009/0307361 | A1* | 12/2009 | Issa et al. .............. 709/229 |
| 2009/0307759 | A1* | 12/2009 | Schnell et al. ............. 726/4 |
| 2010/0022254 | A1 | 1/2010 | Ashfield et al. |
| 2010/0043060 | A1* | 2/2010 | Reuzel et al. ............. 726/4 |
| 2010/0146051 | A1* | 6/2010 | Agrawal et al. .......... 709/204 |
| 2014/0032483 | A1* | 1/2014 | Tulley et al. ............. 707/607 |
| 2014/0032627 | A1* | 1/2014 | Lorenz et al. ............ 709/201 |
| 2014/0032634 | A1* | 1/2014 | Pimmel et al. ........... 709/203 |

OTHER PUBLICATIONS

Final Office Action dated Dec. 10, 2010 in U.S. Appl. No. 12/271,855, 11 pages.

Non-Final Office Action dated Feb. 27, 2012 in U.S. Appl. No. 12/271,855, 12 pages.

Non-Final Office Action dated Aug. 30, 2012 in U.S. Appl. No. 12/271,855, 11 pages.

Non-Final Office Action dated Feb. 27, 2013 in U.S. Appl. No. 12/271,855, 11 pages.

Final Office Action dated Aug. 1, 2013 in U.S. Appl. No. 12/271,855, 16 pages.

Non-Final Office Action dated Oct. 4, 2010 in U.S. Appl. No. 12/271,854, 13 pages.

Final Office Action Mar. 14, 2011 in U.S. Appl. No. 12/271,854, 11 pages.

Non-Final Office Action dated Dec. 13, 2011 in U.S. Appl. No. 12/271,854, 13 pages.

Non-Final Office Action dated Nov. 9, 2012 in U.S. Appl. No. 12/271,854, 10 pages.

Final Office Action dated Mar. 28, 2013 in U.S. Appl. No. 12/271,854, 11 pages.

Non-Final Office Action dated Oct. 11, 2011 in U.S. Appl. No. 12/271,853, 17 pages.

Non-Final Office Action dated May 31, 2012 in U.S. Appl. No. 12/271,853, 24 pages.

Non-Final Office Action dated Dec. 20, 2012 in U.S. Appl. No. 12/271,853, 18 pages.

Final Office Action dated Sep. 3, 2013 in U.S. Appl. No. 12/271,853, 21 pages.

Non-Final Office Action dated Oct. 7, 2014 in U.S. Appl. No. 12/271,853, 21 pages.

Final Office Action dated Jul. 11, 2012 in U.S. Appl. No. 12/271,854, 14 pages.

\* cited by examiner

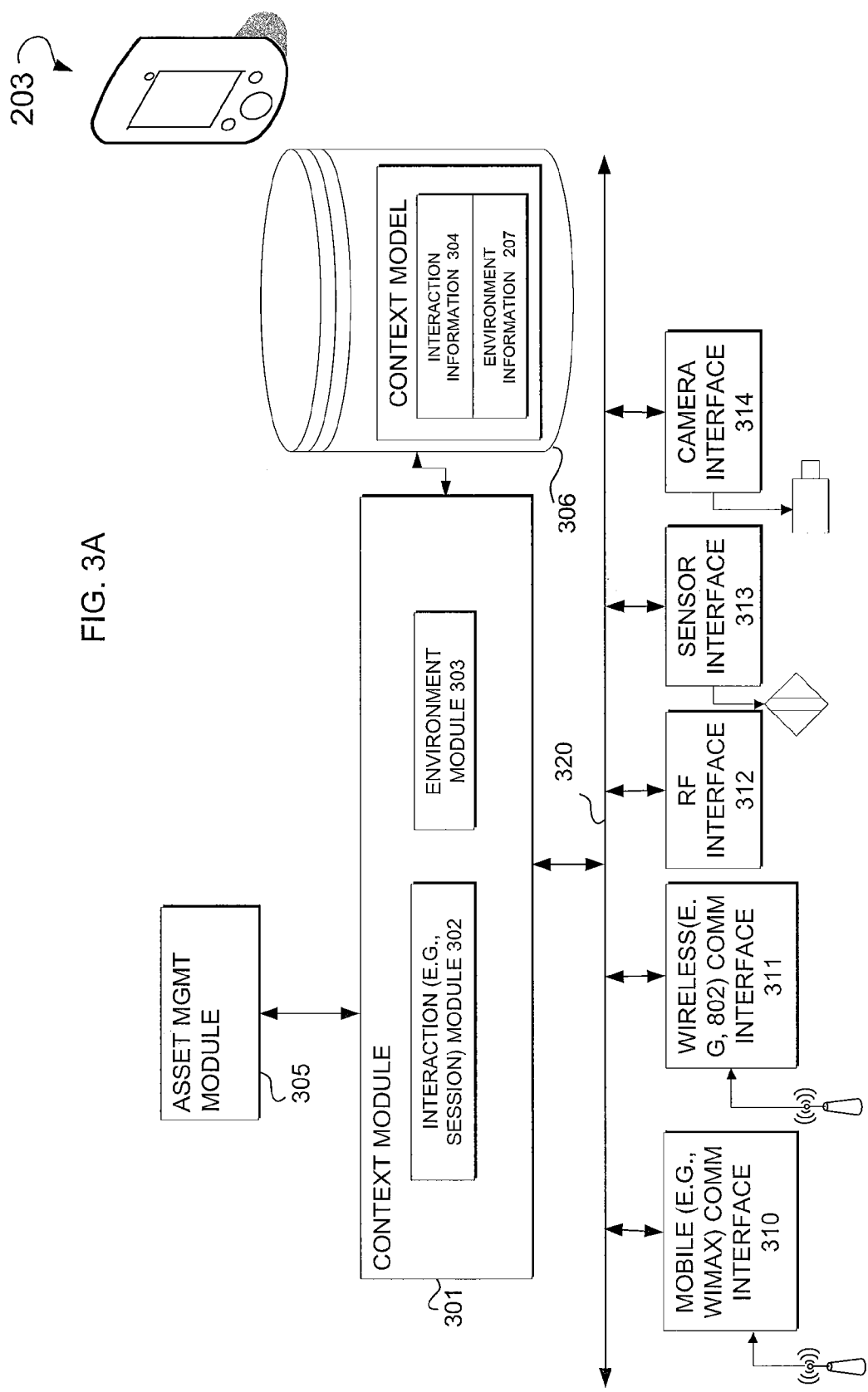

METHODS AND SYSTEMS FOR DISTRIBUTING RIGHT-PROTECTED ASSET

CROSS-REFERENCE TO RELATED APPLICATIONS

This application relates to and has the same priority date as the following applications, U.S. Non-Provisional patent application Ser. No. 12/271,853, entitled ASSET DISTRIBUTION ARCHITECTURE AND TIMELINE HISTORY; U.S. Non-Provisional patent application Ser. No. 12/271,854, entitled SESSION AWARE NOTIFICATIONS; and U.S. Non-Provisional patent application Ser. No. 12/271,855, entitled PARTICIPANT AND PROXIMITY AWARENESS APPLICATION.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED. All Rights Reserved.

TECHNICAL FIELD

The present application relates generally to the technical field of data processing. An example embodiment relates to distributing right-protected asset using a network.

BACKGROUND

Manufacturers protect their product using licensing right, copyright, etc. A violation may occur when a user attempts to use a product without legally obtaining permission from the manufacturer. To avoid the violation, the user has to obtain the permission by purchasing the product from official channels such as, for example, the manufacturers' authorized representatives. The authorized representatives may include dealers or sellers who have agreements with the manufacturers and who receive financial incentives resulting from the sale of the manufacturers' products

BRIEF DESCRIPTION OF DRAWINGS

Some embodiments are illustrated by way of example and not limitation in the figures of the accompanying drawings in which:

FIG. 3A is a diagram illustrating example architecture of a device, in accordance with some example embodiments.

DETAILED DESCRIPTION

For some example embodiments, methods and systems to enable distributing right-protected assets are disclosed. In the following description, for purposes of explanation, numerous specific details are set forth in order to provide a thorough understanding of some example embodiments. It will be evident, however, to one skilled in the art that the present invention may be practiced without these specific details.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Network Architecture

Figure 1:
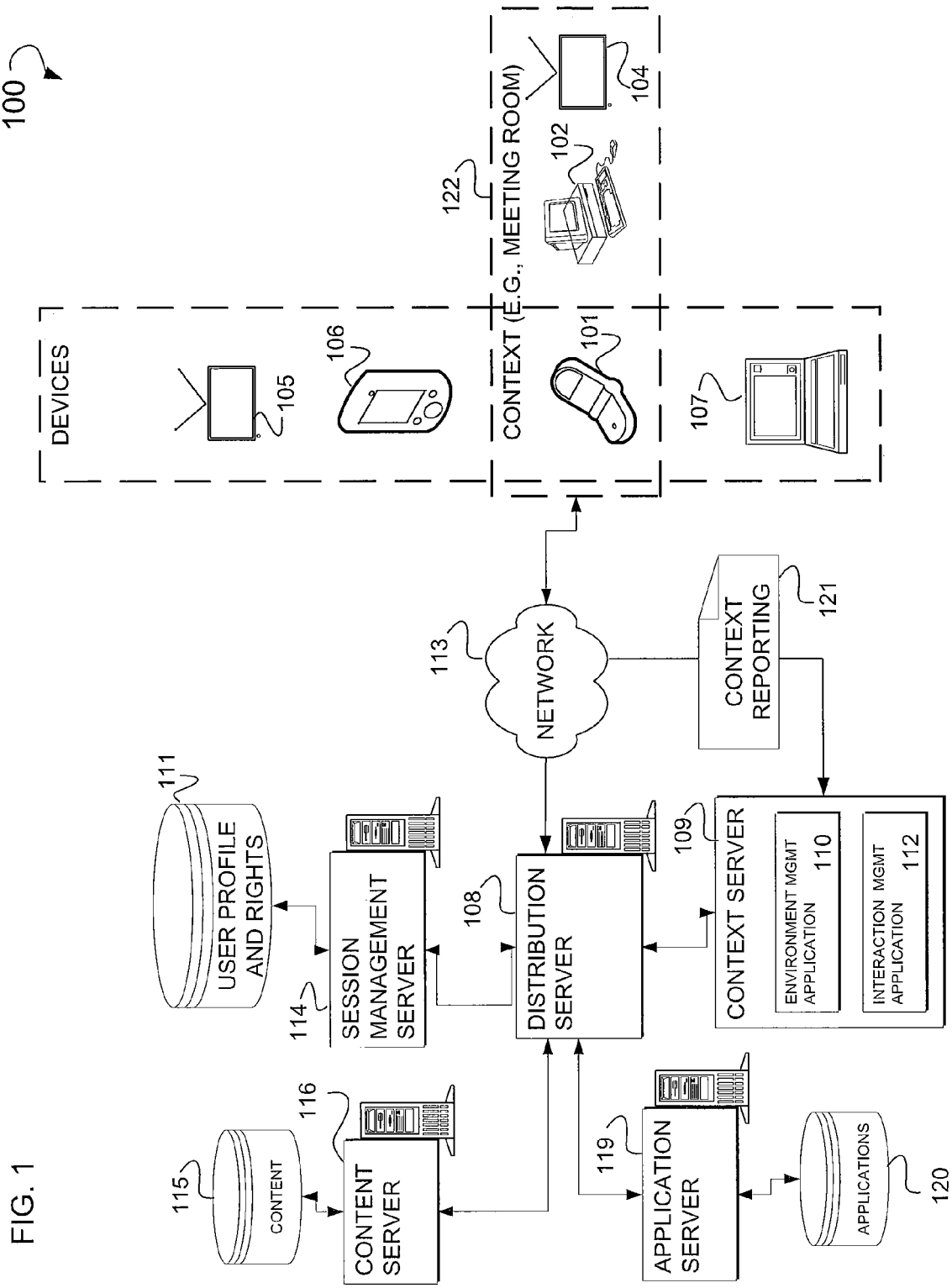
FIG. 1 is a diagram illustrating an example network including network devices and devices, in accordance with some example embodiments.

FIG. 1 is an example network diagram illustrating network devices and devices, in accordance with some example embodiments. In this example, various types of devices may be used. These devices may include, for example, a television 105, Personal Digital Assistant (PDA) 106, cell phone 101, and laptop computer (e.g., "laptop") 107. One or more of these devices may participate in a context 122 with other devices. These other devices may include, for example, a computer 102 and a television 104. The context 122 may be defined to include information about the participating devices (e.g., features, asset, position, etc.), interactions (e.g., sharing asset, etc.) among the devices, and users or operators of the devices. Within the context 122, the cell phone 101, the computer 102, and television 104 may share an asset. Examples of an asset may include content such as a photograph or an application such as a software product.

For some example embodiments, one or more of the devices 101, 102, 104 participating in the context 122 may engage in context reporting. A context report 121 may be generated. The context report 121 includes information relating to the devices and the users participating in a context. The context report 121 may be formatted using an eXtensible Markup Language (XML). The context report 121 may be transmitted from a device to network 113 and received by, for example, distribution server 108. The distribution server 108 may store the context report 121 and may share the context report 121 with other devices. The network 113 may be an Internet, a Local Area Network (LAN), a Wide Area Network (WAN), a combination of the Internet, LAN and/or WAN, or some other suitable type of network as associated topology.

For some example embodiments, the distribution server 108 may be connected to a session management server 114, a context server 109, a content server 116, and an application server 119. These various servers (e.g., 108, 114, 109, and 116) may participate in a cloud computing paradigm. Additionally, these various servers may be implemented on a single computer system, or multiple computer systems. The distribution server 108 may be configured to receive information from the devices 101, 102, 104 and to route the information to one or more of the servers 109, 114, 116 and 119. In addition, the distribution server 108 may be configured to distribute information received from one or more of the servers 109, 114, 116 and 119 to one or more of the devices 101, 102, 104.

The context server 109 may include an environment management module 110 and an interaction management module 112. The interaction management module 112 tracks the interactions among the devices 101, 102, 104 in the context 122. Example interactions include the sharing of assets. The environment management module 110 tracks the environment within which the interaction occurs. The environment includes information relating to the interaction such as the physical location of the devices 101, 102, 104 participating in the context 122, the time and date of participation by the devices 101, 102, 104 within the context 122, the amount and type of assets shared and other suitable information.

The session management server 114 may be used to establish and manage one or more sessions. A session is uniquely identified via a unique numeric identifier (also referred to as a session ID). A session may include one or more devices and may enable the devices to communicate with one another. Each device may be associated with a unique device identifier (also referred to as a device ID). Each user or operator of a device may be associated with a user identifier (also referred to as a user ID). A combination of a session ID with a user ID and/or a device ID may be used to identify participants of a session. The term participant may refer to a combination of either one or both of the user ID and device ID.

The session management server 114 may be associated with a user profile and rights data base 111 which may be used to store the session ID, the user ID, and/or the device ID. The right may include legal rights associated with an asset and its use. The user profile may include personal information about the users of the devices along with their corresponding user IDs.

The content server 116 may be configured to keep track of content (or content items) that may be distributed to the devices 101, 102, 104. The contents may include images, video, audio-video, and text-based content. The content is stored in the content data base 115 connected to the content server 116. The application server 119 may be configured to keep track of applications that are distributed to the devices 101, 102, 104. The applications may include executable modules, software components, software applications, etc. These applications are stored in the application database 120. These applications may be used to enhance, augment, supplement, or facilitate the functionality of one or more of the devices 101, 102, 104.

Context and Session Establishment

Figure 2:
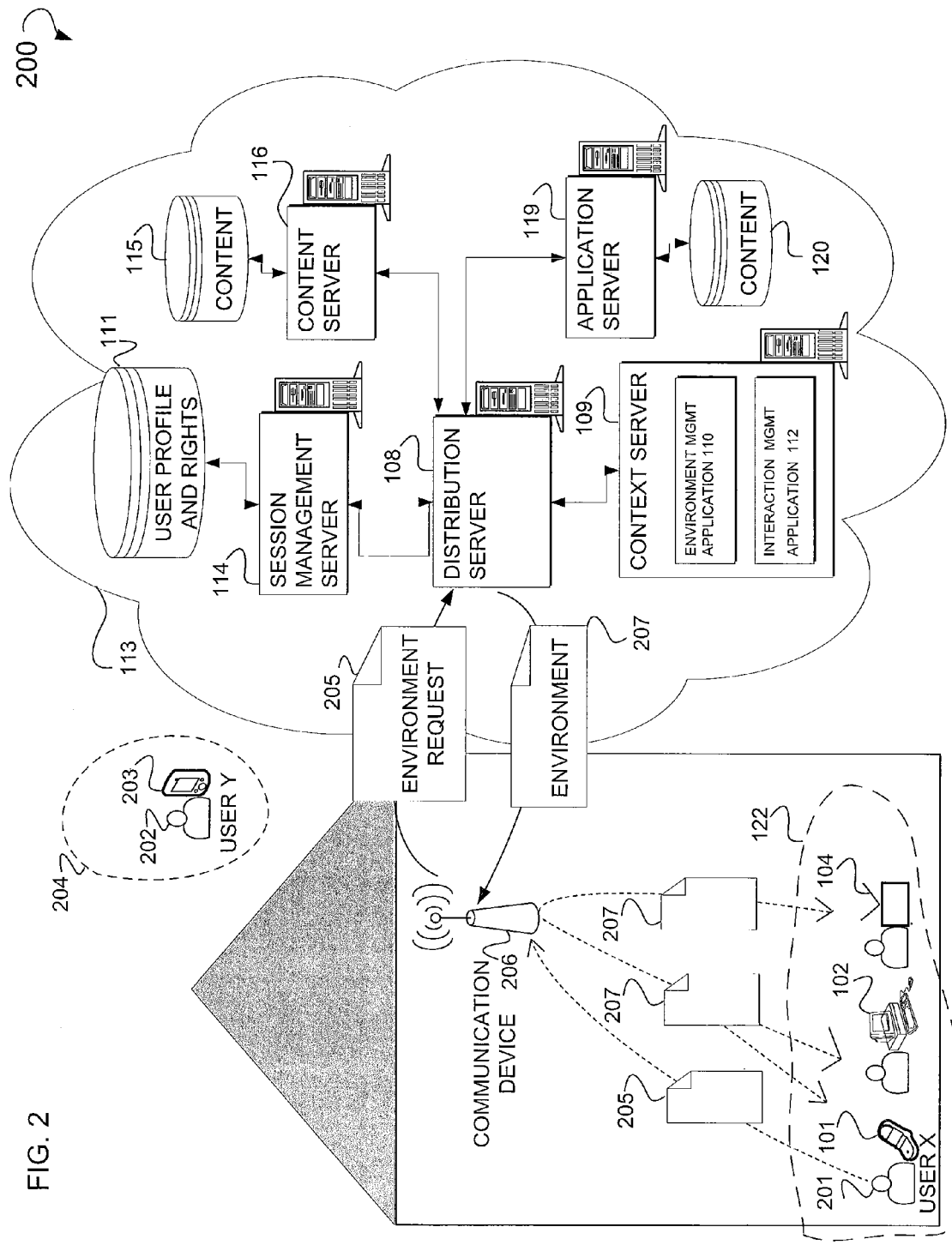
FIG. 2 is a diagram illustrating connection examples of the devices in a network, in accordance with some example embodiments.

FIG. 2 is an example diagram illustrating establishment of sessions in a network, in accordance with some example embodiments. In this example, a user 201, referenced as "user x," is associated with the cell phone 101. The user 201 may also be associated with other devices. Further, shown is the computer 102 and television 104. As previously illustrated in FIG. 1, the cell phone 101, the computer 102, and the television 104 all participate in the context 122. The context 122 may be in the form of a physical structure (e.g., a meeting room, a living room, a coffee shop, etc.). For some example embodiments, each of the devices 101, 102 and 104 may be equipped with a communication interface (e.g., a wireless interface) to enable the device to establish a wireless connection with a wireless router device such as, for example, the communication device 206.

For some example embodiments, the user 201 generates an environment request 205 that is received by the communication device 206 and transmitted across the network 113. The environment request 205 may request for environment information relating to the relative physical location of the devices in a particular context. The environment information may have been previously generated and stored by the environment management module 110 of the context server 109.

The distribution server 108 may receive the environment information 207 from the context server 109 and transmit the environment information 207 to the communication device 206 and to at least the device (e.g., the cell phone 101, computer 102, or television 104) that initiated the environment request 205. Additionally, illustrated is a user 202, referenced as a "user y." The user 202 may be associated with context 204 in which the PDA 203 participates. For some example embodiments, the context 204 and context 122 may be combined together to form a single context. This combination of the two contexts 122 and 204 may occur where the PDA 203 joins the context 122. Joining may occur, for example, based on the PDA 203 being relocated to a location within the context 122.

Device Architecture

FIG. 3A is an example diagram illustrating architecture of a device, in accordance with some example embodiments. Illustrated is an example PDA 203 that includes functionality that enables the PDA 203 to interact with other devices. The interactions may occur in an environment or a session. The various blocks illustrated in FIG. 3A may be implemented using hardware, firmware, or software. Context module 301 includes an interaction module 302 and an environment module 303. This interaction module 302 may be used to establish a session in which the device 203 may participate. Additionally, the context module 301 may include an environment module 303 that is used to generate the environment request 205, and to process the environment information 207.

Connected to the context module 301 is an asset management module 305. The asset management module 305 may be used to process assets including content and applications. Processing includes, for example, display, play, record, and execute. Example applications include FLASH™ of Adobe Systems Incorporated, ACROBAT™ of Adobe Systems Incorporated, PHOTOSHOP™ of Adobe Systems Incorporated., or some other suitable application. The context module 301 may be connected to a database 306 which may store environment information 207. The database 306 may also store interaction information 304. Included as part of the interaction information 304 may be session information including a session ID along with user ID and/or device ID. The environment information 207 and the interaction information 304 may be parts of a context model 308. The PDA 203 may include various types of communication interfaces 310-314 to facilitate establishing a session, to communicate with other devices, to receive and to generate content, etc.

A combination of at least the context module 301 and the asset management module 305 in a device such as the PDA 203 (as described in FIG. 3A) may be referred to collectively as agent software. The agent software enables a device to communicate with the distribution server 108 and the other servers connected to the distribution server 108 in the network 113. The server and database resources connected to the network 113 (as described in FIGS. 1-2) may be referred to collectively as network services. For some example embodiments, a user may be associated with one or more devices, with each device having a unique device ID. Each user may be associated with a unique user ID.

Figure 3B:
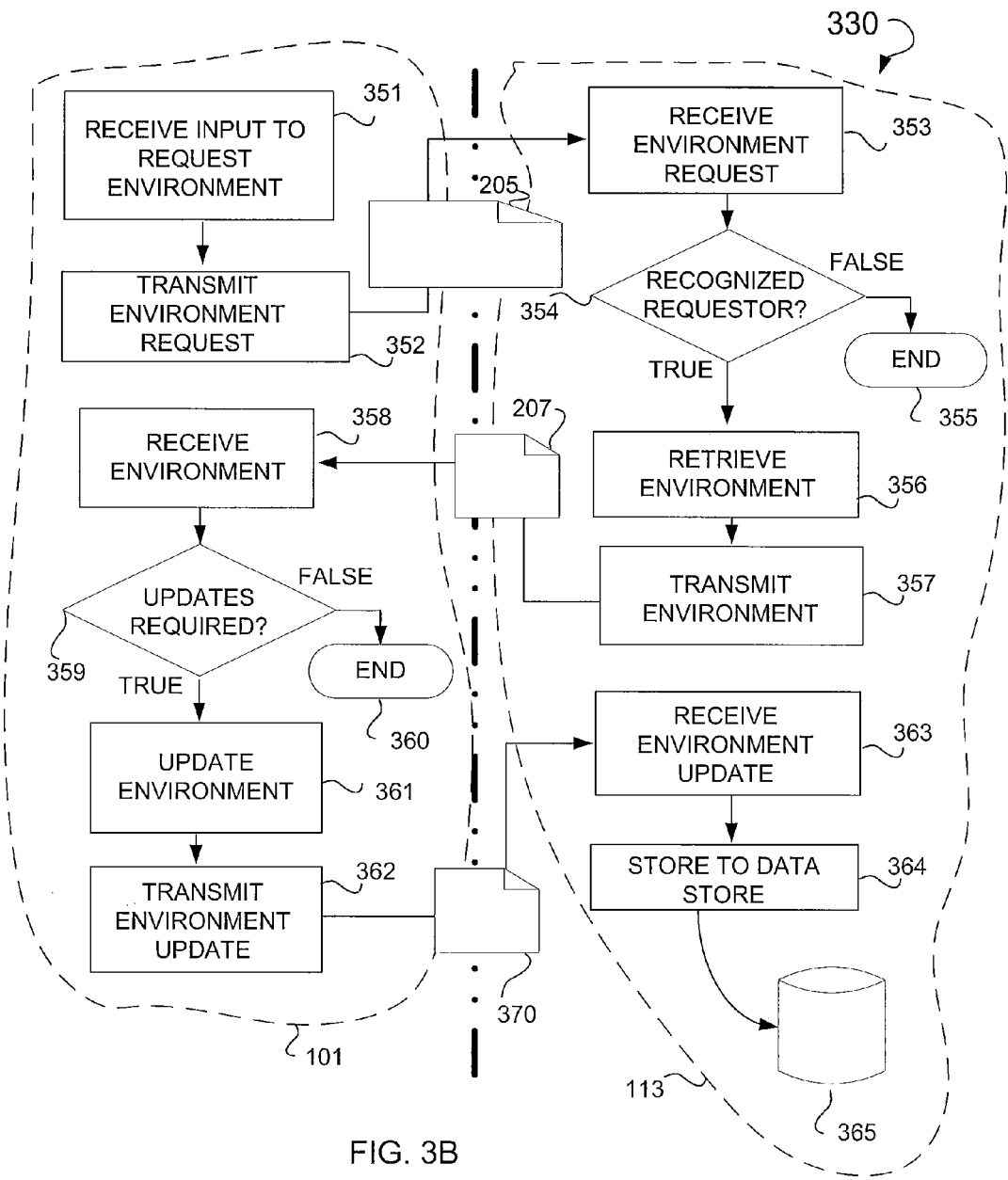
FIG. 3B is a flow diagram illustrating an example method of accessing environment information using a device, in accordance with some example embodiments.

FIG. 3B is a flow diagram illustrating an example method of accessing environment information using a device, in accordance with some example embodiments. The flow diagram may be used to request and receive an environment and to generate an environment update. Shown are operations 351 through 352, and 358 through 362. These various operations may be executed by the cell phone 101, or other suitable device that interacts in a context. Also shown are operations 353 through 357, and 363 through 364. These various operations are executed with the network 113 and the various servers (e.g., 108, 114, 109, and 116) illustrated therein. For example, the distribution server 108 may execute these various operations 353 through 357, and 363 through 364. Shown is an operation 351 that, when executed, receives input to request an environment. This input may be generated by an input device such as a touch screen, mouse, keyboard, light pen, or other suitable input device. Operation 352 is executed to transmit the environment request 205. Operation 353, when executed, receives the environment request. Decisional operation 354 is executed to determine whether the device, and user associated therewith, is recognized as being able to request an environment. Where decisional operation 354 evaluates to "false," a termination condition 355 is executed as the requesting device or user is unrecognized. In case where decisional operation 354 evaluates to "true," an operation 356 is executed. Operation 356, when executed, retrieves an environment from, for example, the context server 109 and data store associated therewith (not pictured). Operation 357 is executed to transmit the environment 207. Operation 358 is executed to receive the environment 207. In some example embodiments, the operation 358 is executed by one of more of the interfaces shown in FIG. 3A. A decisional operation 359 is executed to determine whether an update of the environment 207 is required. In cases where decisional operation 359 evaluates to "false," a termination condition 360 is executed. In cases where decisional operation 359 evaluates to "true," an operation 361 is executed. Operation 361 is executed to update the environment 207. This update may include additional location information relating to the cell phone 101, or other device participating in the context 122. Operation 362 is executed to transmit an environment update 370. This environment update 370 is received through the execution of operation 363. Operation 364 is executed to store the environment update 370 into a data store 365.

Association of Right-Protected Asset and Users

Figure 4:
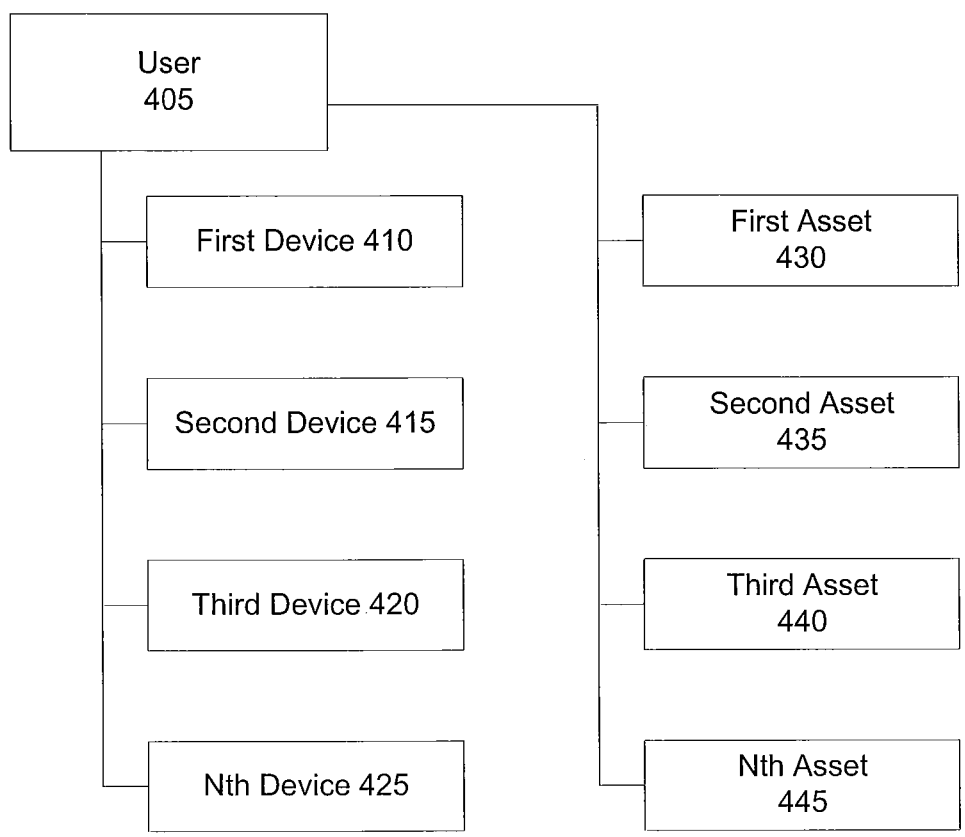
FIG. 4 is a diagram illustrating relationships of user, device and right-protected asset, in accordance with some example embodiments.

For some example embodiments, each user may be associated with zero or more right-protected asset. A right-protected asset may be a content item that is protected such as, for example, a copyrighted photograph or a copyrighted movie or video. The right-protected asset may be a software product such as, for example, a licensed copy of photo-sharing software. FIG. 4 is a diagram illustrating relationships of user, device and right-protected asset, in accordance with some example embodiments. A user 405 may be associated with the user ID. The user ID may be assigned to the user by a network administrator associated with the network services. The user 405 may be associated with the devices 410-425. This association may be performed when the user registers the devices 410-425 with the network services using, for example, a device registration interface. This association may be updated when the user adds a new device or when the user removes a device using the device registration interface. The user 405 may be associated with right-protected assets 430-445. Each of the right-protected assets 430-445 may have been purchased or acquired legally by the user 405. The relationship illustrated in FIG. 4 may be stored in the user profile and rights database 111 illustrated in FIG. 2.

Association of Right-Protected Asset and Devices

Figure 5:
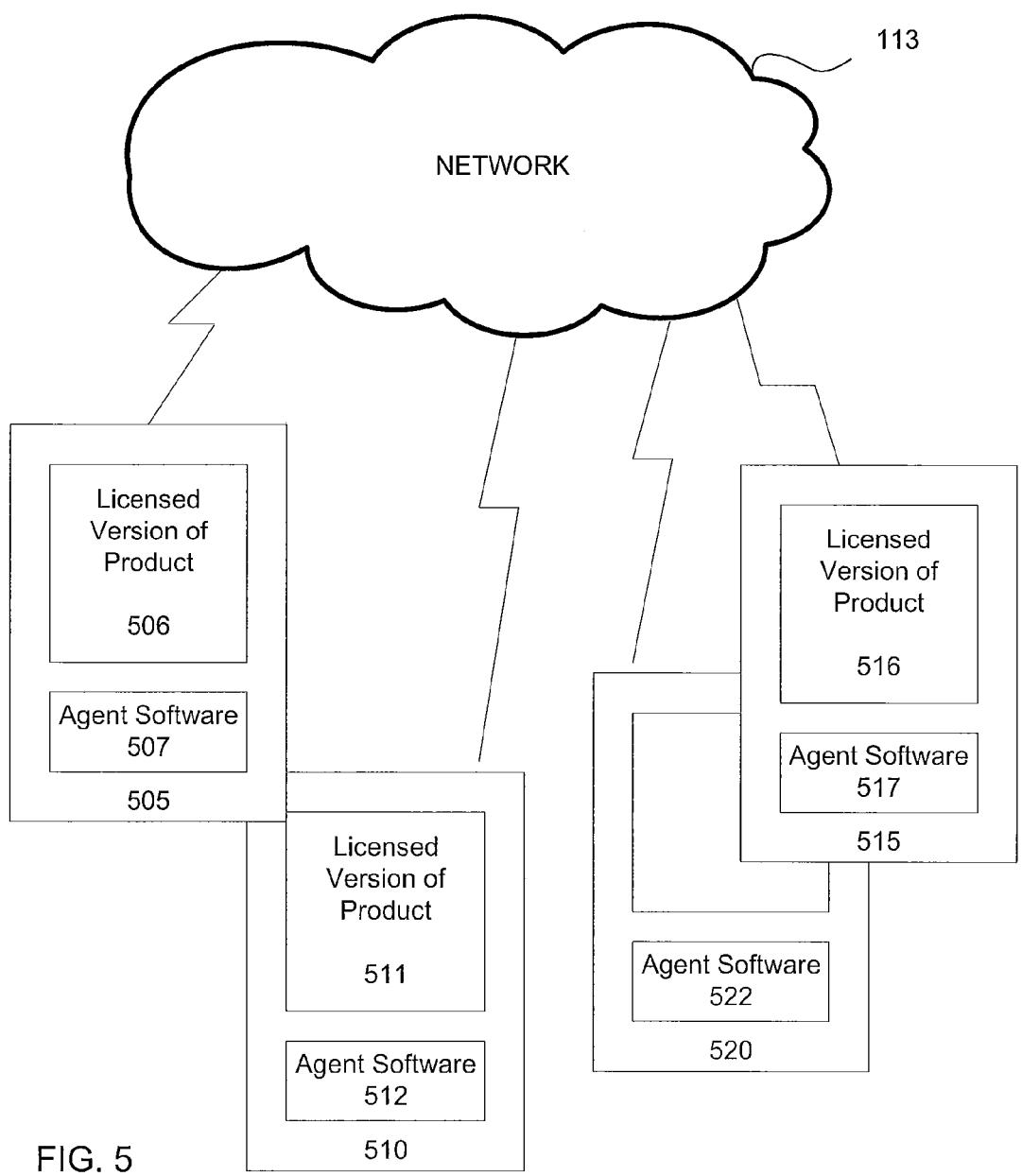
FIG. 5 is an example network diagram illustrating devices having right-protected asset, in accordance with some example embodiments.

FIG. 5 is an example network diagram illustrating devices having right-protected asset, in accordance with some example embodiments. As described above, the right may include legal rights associated with an asset and its use. In this example, the right-protected asset may be in the form of a software product. As illustrated, devices 505, 510, 515 and 520 are capable of being connected to the network 113 and to transmit and receive information to and from the network services. Each of the devices 505, 510, 515 and 520 may be associated with a different user and may include agent software 507, 512, 517 and 522, respectively. Since the devices 505, 510, 515 and 520 may be different types of devices, they may have different features and capabilities. Although the products 506, 511 and 516 may run on the respective devices 505, 510 and 515, the product 506 running on the device 505 may not necessarily run on the device 510. It may be noted that the device 520 (with agent software 522) does not have any of the products 506, 511 or 516. Typically, to acquire the right to use any of the products 506, 511 or 516, a user using the device 520 may need to contact the product manufacturers or their authorized dealers.

Sharing Right-Protected Asset

For some example embodiments, a user using a first device may be able to share one or more of the products with another user using a second device when the first device is positioned within a close proximity of the second device. For some example embodiments, in addition to the first device and the second device being within a close proximity, the first device and the second device need to be in the same session. Different techniques may be used to enable the first device and the second device to be in the same session. This may include one device inviting another device to join an existing session. This may include a user signing on to the network and specifying information related to a specific session ID provided by another user. This may include receiving automatic invitation to join based on previously configured group of permitted devices. Regardless of how a device being included in a session, the session management server 114 (illustrated in FIGS. 1 and 2) keeps track of active sessions, devices and users participating in the sessions.

Figure 6:
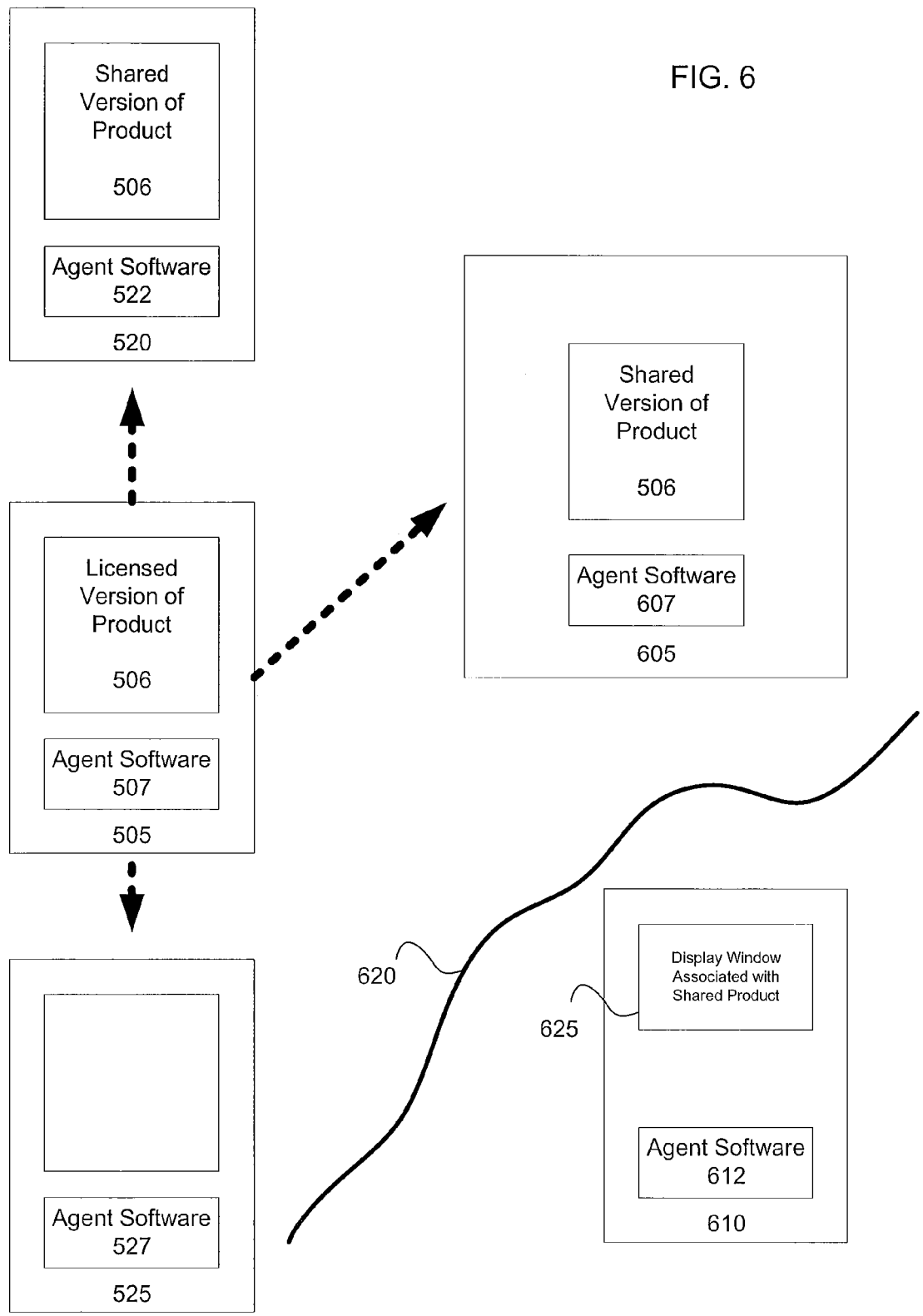
FIG. 6 is a diagram illustrating examples of sharing right-protected asset, in accordance with some example embodiments.

FIG. 6 is a diagram illustrating examples of sharing right-protected asset, in accordance with some example embodiments. In this example, device 505 may share a right-protected asset with devices 520, 525 and 605, as illustrated by the dotted lines. Device 525 is a limited-capability device comparing to the devices 520 and 605. For some example embodiments, when the device 505 is located within a determinable proximity with the devices 520, 525 and 605, the device 505 may share a right-protected asset (e.g., the product 506) with the devices 520, 525 and 605. A right-protected asset may be associated with a legal right such as, for example, a license or a copyright.

For some example embodiments, the sharing of a right-protected asset may include the device detecting other nearby devices and transmitting a request to share the right-protected asset to the network services. The request may include a device ID of the device that the right-protected asset is being shared with. In the current example, either or both of the devices 520 and 605 are the devices that the product 506 is being shared with.

For some example embodiments, the network services may keep track of multiple versions of a right-protected asset so that they can be used with different devices. The network services may also keep track of features or configurations of devices that are associated with the users. This will enable the network services to transmit the correct version of a right-protected asset to a device based on the features of that device. For example, the device 520 may be a PDA while the device 605 may be plasma television. Based on the device ID of the device 605, the network services may transmit a version of the product 506 that has more features to the device 605 as compared to a version that is transmitted to the device 520.

For some example embodiments, the sharing of a right-protected asset may include sharing control of the right-protected asset with a first device while sharing other information associated with the right-protected asset with a second device. This may enable the sharing of the right-protected asset with a device that has limited capabilities. As illustrated in FIG. 6, the device 525 is a limited-capability device, and the device 605 is used with the device 525 such that the device 525 may be used to control the presentation of the information associated with the product 506 on the device 605.

As noted above, a right-protected asset may be shared based on the devices being positioned within a determinable proximity. For some example embodiments, a device may use a screen mirroring feature to view information being presented on another device positioned in a different location. This other device may be presenting information associated with a right-protected asset. Referring to FIG. 6, even though the device 610 is positioned in a different location from the devices 505, 520, 525, and 605 (e.g., based on separator 620), they may all be in the same session. The device 610 may request the network services to stream the information being presented on the device 605 to a window 625 on the display of the device 610. A user using the device 610 may have limited or no control over the information being presented in the window 625.

For some example embodiments, the sharing of a right-protected asset may be temporary or on a limited basis. The sharing may be with implied permission by the owner (e.g., product manufacturer) of the right-protected asset. The limited basis may be based on a fixed time period or based on duration while the devices are within the determinable proximity of one another (e.g., inside a meeting room). When the limited basis is based on a fixed time period, the sharing of the right-protected asset may terminate when the fixed time period expires. When the limited basis is based on the determinable proximity, the sharing of the right-protected asset may terminate when the device that is associated with the right-protected asset is relocated beyond the determinable proximity (e.g., outside the meeting room). For some example embodiments, the sharing of the right-protected asset may be expressly terminated at any time.

Restriction to Sharing of Right-Protected Asset

For some example embodiments, the network services may associate each right-protected asset with a profile. The profile may include restriction information that may restrict the sharing of the right-protected asset. The network services may verify the profile and determine whether to approve or deny the request to share based on the restriction information. For example, the restriction information may indicate that the sharing of the right-protected asset is allowed or completely prohibited. Alternatively, the restriction information may indicate that the sharing may be limited.

Acquiring Right-Protected Asset

For some example embodiments, the network services may detect when the sharing of a right-protected asset terminates. This may be based on receiving a notification from a device that shares the right-protected asset. For some example embodiments, the network services may keep track of the devices that the right-protected asset is shared with. This may enable the network services to send a notification message to the devices that options to acquire the right-protected asset are available. For some example embodiments, the notification is sent shortly after the sharing of the right-protected asset terminates. For some other embodiments, the notification message is sent when the right-protected asset is accessed in the device that the right-protected asset was shared with before the sharing was terminated.

Flow Diagrams

Figure 7:
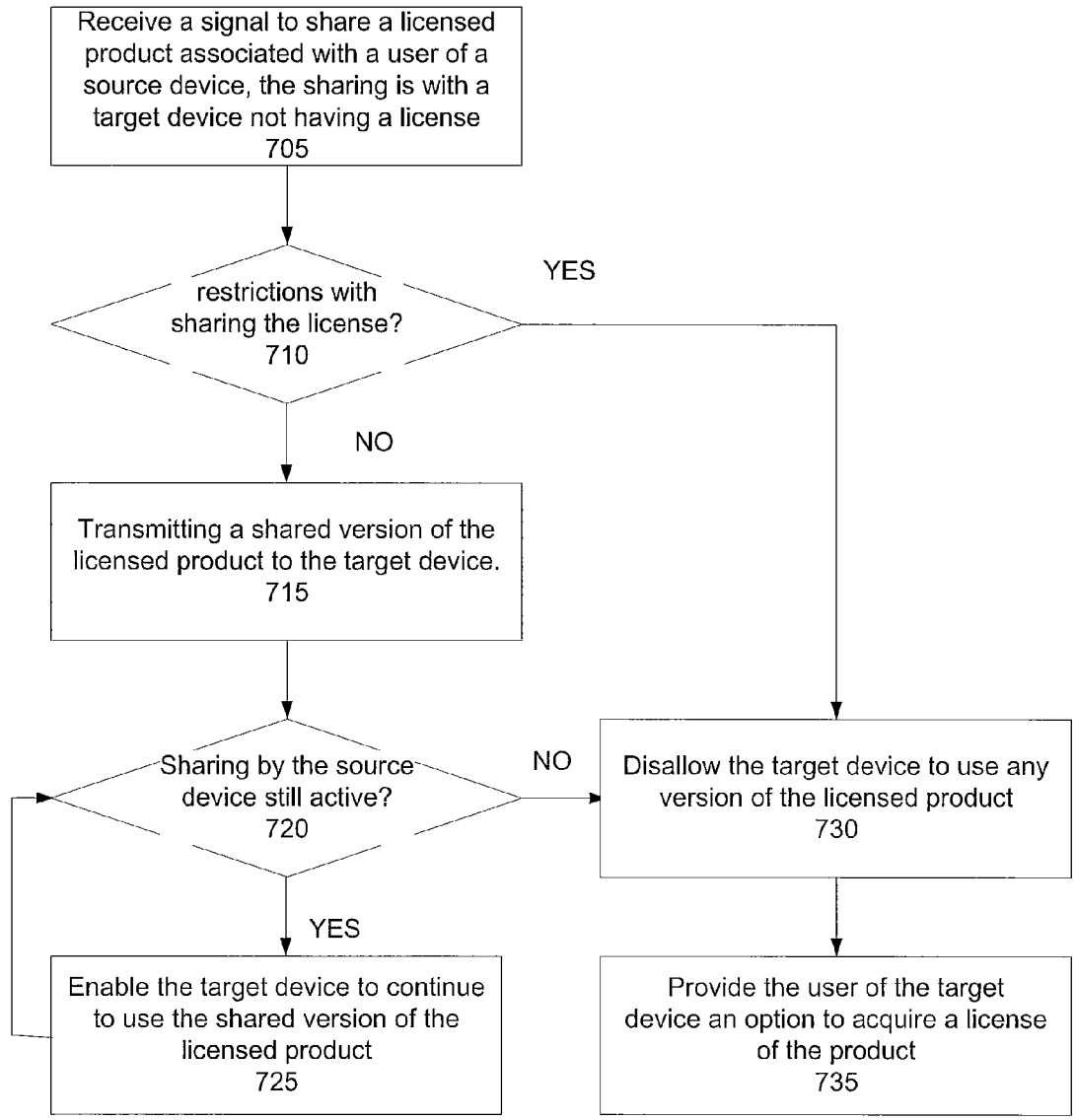
FIG. 7 is a flow diagram illustrating a process that may be used to share right-protected asset, in accordance with some example embodiments.

FIG. 7 is a flow diagram illustrating a process that may be used to share right-protected asset, in accordance with some example embodiments. The process may be performed by the network services and may start at block 705, where a request is received to share a right-protected asset. The request may be associated with a device and may enable that device to share a right-protected asset with another device (or target device). The request may be received by the network services.

At block 710, the network services may determine whether there are any restrictions with the sharing of the right-protected asset. When there is no restriction, the process flow to block 715 where a copy of the right-protected asset may be transmitted to the target device. At block 720, it is determined whether the sharing of the right-protected asset remains active. For example, the sharing may remain active when the device that shares the right-protected asset is still located within a determinable proximity of the target device. When the sharing of the right-protected asset remains active, the flow continues to block 725 where the target device continues to access the right-protected asset. When the sharing terminates, the flow continues to block 730 where the target device is disallowed or prevented from accessing the right-protected asset. At block 735, information related to an option to acquire the right-protected asset is transmitted to the target device.

Figure 8:
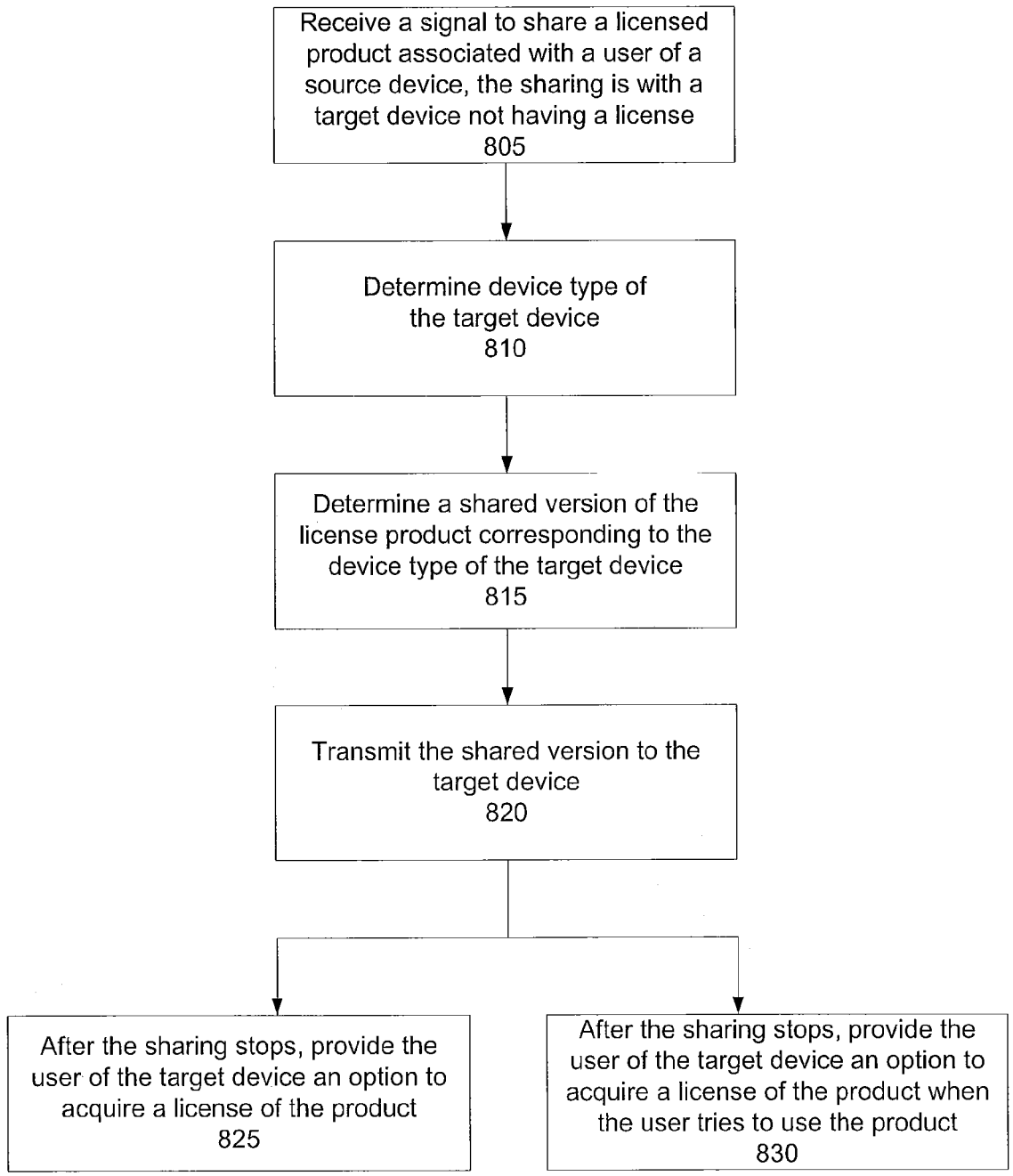
FIG. 8 is a flow diagram illustrating a process that may be used to transmit a shared version of a right-protected asset, in accordance with some example embodiments.

FIG. 8 is a flow diagram illustrating a process that may be used to transmit a shared version of a right-protected asset, in accordance with some example embodiments. The process may be performed by the network services and may start at block 805 where a request to share a right-protected asset is received. The request may include a device ID of a target device. The device ID may be received based on the target device being in the same session as the device that shares the right-protected asset.

At block 810, configuration of the target device may be determined. For example, using the device ID of the target device, the network services may access information about the target device. This information may be previously stored when the target device is registered with the network services. Different devices may have different configurations. The network services may use the configuration to determine a correct version of the right-protected asset to transmit to the target device, as shown in block 815.

At block 820, the version of the right-protected asset is transmitted to the target device. From block 820, the flow may continue to block 825 where an option to acquire the right-protected asset may be transmitted to the target device by the network services. The option may be transmitted to the target device after the sharing terminates. Alternatively, the flow may continue from block 820 to block 830 where an option to acquire the right-protected asset may be transmitted to the target device when there is an attempt to access the right-protected asset.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 9:
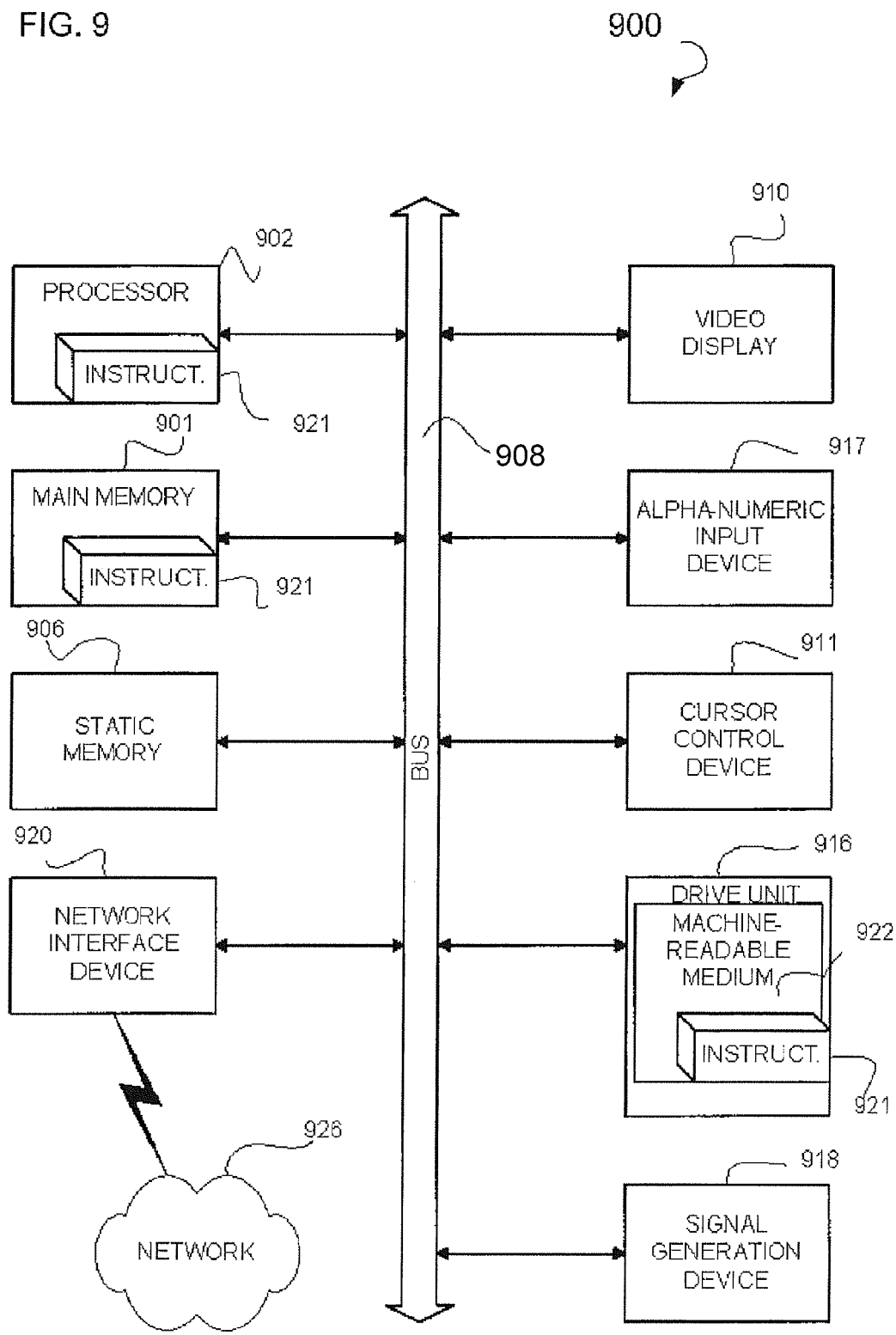
FIG. 9 is a block diagram of machine in the example form of a computer system within which instructions, for causing the machine to perform any one or more of the methodologies discussed herein, may be executed, in accordance with some example embodiments.

FIG. 9 is a block diagram of machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a video display unit 910 (e.g., liquid crystal display (LCD) or a cathode ray tube (CRT)). The computer system 900 also includes an alphanumeric input device 917 (e.g., a keyboard), a user interface (UI) navigation device 911 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software 921) embodying or utilized by any one or more of the methodologies or functions described herein. The software 921 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 921 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments illustrated. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A processor-implemented method comprising:
   using at least one processor coupled to a memory,
   receiving, at a server computer system, a request, from a first computing device, to share a right-protected asset with a second computing device, wherein the request is received while the first computing device and the second computing device are both connected to a common wireless communication device;
   transmitting, from the server computer system, the right-protected asset to the second computing device while the first computing device and the second computing device are both connected to a common wireless communication device;
   responsive to at least the server computer system detecting that the second computing device and the first computing device are no longer both connected to the common wireless communication device, preventing the second computing device from accessing the right-protected asset; and providing the second computing device an option to acquire the right-protected asset while the second computing device and the first computing device are no longer both connected to the common wireless communication device and subsequent to providing the right-protected asset to the second computing device.

2. The processor-implemented method of claim 1, wherein the receiving, at the server computer system, of the request to share the right-protected asset with the second computing device is in response to the second computing device connecting to the common wireless communication device.

3. The processor-implemented method of claim 1, wherein the option to acquire the right-protected asset is provided responsive to detecting an attempt to access the right-protected asset on the second computing device.

4. The processor-implemented method of claim 1, wherein the first computing device shares the right-protected asset with the second computing device based on a restriction associated with the right-protected asset.

5. The processor-implemented method of claim 1, wherein the right-protected asset is stored in the server computer system.

6. The processor-implemented method of claim 5, wherein the transmitting the right-protected asset from the server computer system to the second computing device comprises transmitting a version of the right-protected asset based on a configuration of the second computing device.

7. The processor-implemented method of claim 5, wherein the providing of the second computing device the option to acquire the right-protected asset comprises transmitting the option from the server computer system to the second computing device.

8. The processor-implemented method of claim 2, wherein the receiving, at the server computer system, of the request to share the right-protected asset with the second computing device is further in response to the second computing device sharing a session with the first computing device.

9. The processor-implemented method of claim 1, wherein preventing the second computing device from accessing the right-protected asset is further responsive to the server computer system detecting that the second computing device is no longer sharing a session with the first computing device.

10. The processor-implemented method of claim 9, wherein the communication device is a wireless router device.

11. A non-transitory computer storage medium storing computer-useable instructions that, when used by one or more computing devices, cause the one or more computing devices to perform operations comprising:

receiving, at a server computer system, a request, from a first computing device, to share a right-protected asset with a second computing device, the second computing device and the first computing device both being connected to a common wireless communication device;

transmitting, from the server computer system, the right-protected asset to the second computing device while the second computing device and the first computing device are both connected to the common wireless communication device;

responsive to at least the server computer system detecting that the second computing device and the first computing device are no longer both connected to the common wireless communication device, preventing the second computing device from accessing the right-protected asset;

providing the second computing device an option to acquire the right-protected asset while the second computing device and first computing device are no longer both connected to the common wireless communication device and subsequent to providing the right-protected asset to the second computing device.

12. The medium of claim 11, wherein the request includes a specific session identifier for joining an active session associated with the first computing device.

13. The medium of claim 11, wherein the wireless communication device is a wireless router device.

14. The medium of claim 11, wherein the request from the first computing device to share the right-protected asset with the second computing device is automatically generated based on a previously configured group of permitted devices.

15. The medium of claim 11, wherein the request from the first computing device to share the right-protected asset with the second computing device is automatically generated in accordance with the second computing device being in communication with the wireless communication device.

16. The medium of claim 11, wherein providing the second computing device the option to acquire the right-protected asset occurs automatically after the server computer system detects that the second computing device is no longer in communication with the common wireless communication device.

17. The medium of claim 11, wherein transmitting the right-protected asset to the second computing device is based on a profile including restriction information that is operable to restrict sharing of the right-protected asset.

18. The medium of claim 17, wherein the first computing device can terminate sharing of the right-protected asset upon receipt of an express instruction to terminate the sharing thereof.

19. The medium of claim 11, wherein transmitting the right-protected asset to the second computing device further includes determining an appropriate version of the right-protected asset based on a configuration of the second computing device.

20. The medium of claim 11, wherein after receiving the request to share the right-protected asset with the second computing device, the server computer system sends a notification message to the second computing device, the notification message corresponding to the request.

\* \* \* \* \*